Dec. 24, 1929.　　M. U. BURNHAM ET AL　　1,740,680
DRYING APPARATUS
Filed Feb. 20, 1925　　5 Sheets-Sheet 5

Fig. 7.

M. U. Burnham.
G. M. Argabrite
A. A. Dionne
Inventors

By C. J. Stockman
Their Attorney

Patented Dec. 24, 1929

1,740,680

UNITED STATES PATENT OFFICE

MORRIS U. BURNHAM, OF CINCINNATI, OHIO, AND GEORGE M. ARGABRITE AND ARTHUR A. DIONNE, OF CHICAGO, ILLINOIS, ASSIGNORS TO THE ALVEY-FERGUSON COMPANY, OF CINCINNATI, OHIO, A CORPORATION OF OHIO

DRYING APPARATUS

Application filed February 20, 1925. Serial No. 10,577.

In an application for Letters Patent filed by us in the United States Patent Office June 7, 1923 and numbered, serially, 718,661 there is shown, described and claimed a conveying mechanism specially designed for use in the manufacture of shoes on a large commercial scale, the said conveying mechanism being of a nature such that it permits the machinery and the operatives thereof, by which the multiplicity of operations which enter into such manufacture, to be conveniently arranged along the length of the conveying mechanism, the latter carrying the shoes in racks from one machine and its operative to another throughout its progress from a separated sole and upper to a completely finished shoe, ready for shipment. The purposes fulfilled by the said conveying mechanism are the avoidance of congestion, the saving of floor space and, generally, the introduction of important economies in the manufacture of the shoes by expediting the time of the manufacture, the saving of manual labor and the reduction of the number of lasts required.

In the manufacture of shoes it is essential that the soles be in a wet condition while being applied to the uppers and that for subsequent operations the soles must be dry. The process of manufacturing shoes therefore includes the drying of the soles as an intermediate part of the process. The common method of drying the soles consists merely in shoving the wheeled racks, which contain the shoes being made, into a drying space or room and allowing them to remain therein until the shoes are dry and then wheeling the racks with the dried shoes to the machine where the next operation is to be performed. In our application hereinbefore referred to a part of the conveying mechanism traverses a drying chamber within which the shoes are dried in their progress from the machine which performs the operation immediately preceding the drying operation to the machine which performs the operation immediately succeeding said drying.

It is apparent that this avoids all the labor of handling the racks from the time they leave the one machine with the shoes to be dried until they reach the next machine with the shoes in a dried condition and ready for the subsequent operations. In other words, the shoes are dried while in transit from one operative to another without any handling of the racks or shoes while being dried.

Generally stated this invention has relation to the said drying means, one of its important purposes being the provision of a means for artificially drying shoes while in transit from one operative to another in process of manufacture of said shoes.

In another application for Letters Patent of the United States filed by us of even date herewith and numbered serially 10,578 we have shown, described and claimed a method of drying leather characterized by the subjecting of the leather under treatment successively to the action of artificially heated and humidified air and heated substantially dry air.

More particularly stated, this invention has relation to an apparatus capable of carrying the said method into practical effect in a most beneficial way, and still more particularly stated it has relation to a drying means which will artificially dry the shoes in accordance with the method set forth in our said application for Letters Patent of even date herewith and while said shoes are in transit from one operative to another in the process of the manufacture of the shoes.

The accompanying drawings, wherein like characters of reference denote corresponding parts, illustrates the best form of the apparatus comprehended within the present invention but it is recognized that changes in detail may be made and that the invention may be otherwise and differently embodied and we, therefore, reserve to ourselves the right to make such changes without departing from the spirit of the invention as defined by the appended claims. In said drawings:—

Figs. 3, 3A and 3B are horizontal sectional views on a larger scale than the preceding figures, of three sections which combine to form the dryer; Fig. 3 being a view of one end of the dryer, Fig. 3B a view of the other end, and Fig. 3A, a view of the intermediate portion.

A and A' designate two drying sections or chambers, in the form of tunnels. These chambers house successive portions of the conveyor and in them the steps of the drying operation are carried out. They may be of any suitable length and may be correlated in any manner which will enable the articles to be subjected to the various steps of the drying treatment in their travel first through one chamber and thereafter through the other. A very desirable arrangement is that illustrated in the drawings, which show the chambers arranged side by side and in substantial parallelism with each other and with the entrance to the chamber A and the exit from the chamber A' at the same end of the apparatus and said chambers connected with each other near said end by a transverse duct $A^2$ and having their opposite ends connected by a transverse chamber A''. This particular arrangement provides, in effect, a single long tunnel, one part of the length of which constitutes a first drying chamber and a succeeding part of the length of which constitutes a second drying chamber; but any other suitable relative arrangement of the chambers would not be a departure from the spirit of the invention as defined by appended claims.

The articles to be dried are moved at a suitable speed throughout the lengths of both chambers A, A', and also within the chamber A'' from the discharging end of chamber A to the receiving end of chamber A', by conveying means of any suitable construction. The means here shown for exemplary purposes consists of three separate endless traveling conveyors B, B'' and B', arranged in chambers A and A' and chamber A'', respectively, and gravity conveyor sections $b$ and $b'$, respectively arranged to transfer the articles from the discharging end of conveyor B to the conveyor B' and from said conveyor B' to the receiving end of conveyor B''. Each of the illustrated endless traveling conveyors is of that known type comprising endless side chains 10 provided with rollers 11 which traverse upper tracks 12 and lower track 13 and connected with each other by rollers 14 which conjointly form the bed of the conveyor. The tracks 11 and 12 are suitably supported above the bottom 15 of the tunnel as by suitably braced upright frame-members 16 and cross frame-members 17 carried by the bottom wall 15 of the tunnel. This construction of conveyor is simple and practicable, since it provides a strong and yet simple traveling support for the racks X which carry the shoes undergoing the drying operation, and will not sag under the weight of said racks and shoes and may be operated with a minimum of power. It, of course, will be understood that in practice suitable driving and idler sprockets are arranged at appropriate places in the lengths of the conveyors and that the sprockets are engaged by the endless chains and also that suitable means to apply power to the driving sprockets and suitable means to take-up slack, are provided. Since power and take-up means are common in the conveyor art and their application of this type of conveyor is well understood it is unnecessary particularly to illustrate the same as a part of this mechanism.

A suitable air-heating and humidifying means C is arranged outside the chamber A and about midway the length thereof and a suitable air heating means C' similarly is arranged outside of and about midway the length of the chamber A'. The means C may be of any construction or type and capacity which will supply moisture-laden air in sufficient volume and at the temperature required to subject the articles traversing the chamber A to the treatment predetermined for said articles in said chamber, and means C' similarly is of any suitable construction and capacity to supply substantially dry heated air in sufficient quantity and at the required temperature for the treatment predetermined for the articles in their travel through the chamber A'.

Figure 6:
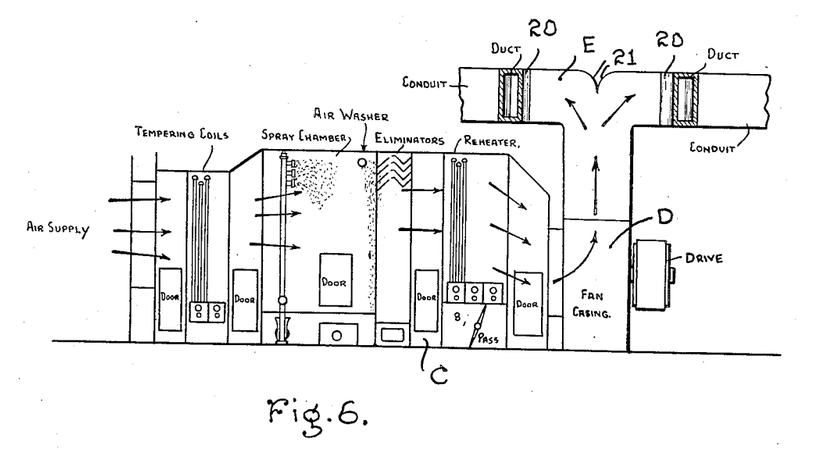
Fig. 6 is a detail sectional view of one form of air conditioning apparatus which may be usefully employed and showing its communication with the trunk which supplies artificially heated and humidified air to the portion of the apparatus in which the shoes are subjected to such air.

The means for producing the heated humidified air to be introduced into the chamber A, which we at present prefer, is shown in Fig. 6. It need not be described in detail since it is a known construction of air washer or air-conditioner, several parts of which are named in said figure.

The heated humidified air is discharged under pressure from a suitable fan D into a conduit E at about the longitudinal center of the latter. This conduit extends lengthwise of the chamber A and has communication with the latter at different places in the length thereof through a series of ducts 20 arranged in a spaced relation along the length of the conduit and chamber. The heated humidified air flows in opposite directions within the conduit, the inlet portion of the conduit being provided with diverging wall members 21 to induce such flow. The sections of the conduit from the inlet to the first duct on each side thereof and from each of said ducts to the next, and so on, are respectively of lesser diameter in accordance with the lesser volumes of humidified air therein, respectively, and in order that the speed of the flow of air may be maintained. To control the supply of this air from the conduit to the chamber at the various places at which the air is introduced into the chamber, each section of the conduit is provided with a suitable manually operable valve or damper 22. These dampers or valves are preferably located adjacent the ducts 20, respectively.

The heated dry air is similarly discharged from the heater C' under pressure from a suitable fan D' into a conduit E'. This conduit is like the conduit E and bears the same relation to the chamber A' that the conduit E does to the chamber A. Its spaced ducts are marked 20', the diverging walls at its inlet end are marked 21' and its dampers or valves are marked 22'.

Suction fans, as indicated at F, F', are employed at the air exit ends of the chambers to insure a rapid venting of said tunnels and in consequence a substantially constant change of the airs therein. The fan F is preferably connected to the chamber A'' and in such operative relation to said chamber and to the chambers A, A' that it will draw the air from the chamber A'' and hence induce a rapid flow of the air in the chambers A, A' toward said chamber. A suitable damper or valve, as indicated at 23, is provided to control the air outlet from the casing 24 which contains this fan. The fan F' is preferably connected to the air outlet end of the chamber A' to draw the air toward said end, and is in operative relationship with the chamber A through the duct A² connecting the chambers with each other at this end of the apparatus.

The ducts 20, 20' at that end of the dryer which is vented by the fan F preferably extend diagonally toward the air discharging point of this end of the dryer and ducts 20, 20' at the other end of the dryer preferably extend diagonally toward the fan F'. In other words, the ducts are arranged to discharge the airs into the chambers in directions which are diagonally toward the vents from said chambers.

Therefore, it will be seen that the pressure fans D, D' and suction fans F, F' co-operate with each other in creating a rapid flow of constantly changing airs in the chambers A, A' and chamber A'' and duct A². These fans, together with provision whereby the airs may be controllably introduced into the chambers at different places in the lengths of the latter enables the operator to regulate the atmospheric conditions with respect to humidity, volume, speed of travel and temperatures of the air in different parts of the chamber A and of the air in different parts of the chamber A'. In practice, the heated humidified air is mainly introduced into the chamber A through the duct or ducts which discharge at about the longitudinal center of the chamber, since this is the place at which the highest temperature is desired. The additional ducts at opposite sides of the central ducts are controllable by their dampers to admit heated humidified air into the respective end portions of the tunnel or chamber A when the need therefor is indicated to maintain the temperature and humidity desired for these parts of said tunnel or chamber. The same is true with respect to the tunnel or chamber A', the air being mainly introduced at about the center of the latter and additional air introduced into the end portions when the need therefor is indicated.

Each of these chambers is preferably provided along its length with a series of doors G to afford access to its interior for testing or other purposes.

In practice, suitable means are provided at appropriate places to show the condition with respect to speed of travel, temperature and humidity of the airs in the chamber and it is apparent that if considered to be desirable, means may be provided to automatically control said volume, speed of travel, temperature and humidity in accordance with a predetermined setting of said means.

No arbitrary rule as to the percentage of humidity, the degree of temperature or the velocity of the airs, or the length of time during which the leather is subjected to these airs can be laid down, as these depend upon variable conditions. We would state, however, that in our practice with welt shoes perfect results have been secured when the air introduced into and flowing from the chamber A has a humidity of approximately 70–75 and a temperature gradually increasing from approximately 80–85 F. to 90–95 F. and then gradually decreasing to 80–85 F., and having a velocity of from about 5000 to 8000 feet per minute: and when the substantially dry air is introduced into the chamber A' and flowing from said chamber has a temperature of about 140–145 degrees F. at the air inlet point to said chamber and gradually reduced to 120–125 degrees F. at the opposite ends of the chamber, with a velocity of from about 5000 to 8000 feet per minute. The velocity of the airs should be determined in accordance with the conditions of the leather and the humidity and temperature of the air. The duration of time within which the shoes remain in each chamber depends upon the style of shoe and character of material, about one and one-half hours being usually sufficient in case of welt shoes while nailed shoes will require less time. It has been found in practice that the subjecting of shoes for the stated period, namely one and one-half hours, to the humidified air of gradually increasing and then decreasing temperature in the chamber A leaves the leather in such shape that remaining moisture can be driven off in the drying temperature to which it is subjected in the chamber A' without any danger whatever of injuring the structure of the leather.

In fact, experience has demonstrated that soles dried in this apparatus are equal in flexibility and durability to those dried naturally under most favorable conditions and, indeed, the drying operation is attended with far less danger than when the shoes are dried in an open steam heated room, the dry air of which frequently breaks down the structure of the leather. It has also been found that the time required in the drying of the soles in this apparatus is reduced from many days to only a few hours, the drying of the shoes by natural atmospheric conditions or in ordinary heated rooms, at present requiring from about three days to about twelve days.

It is desirable in practice to subject the shoes to humidified air near the exit end from the chamber A'. This may be supplied by the air-washer and heater through a duct 30 indicated in Figs. 2 and 3.

Figure 1:
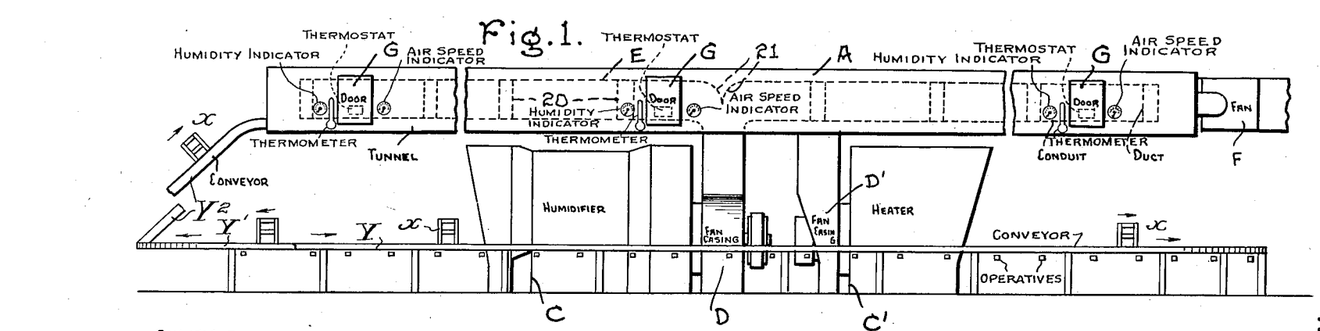
Fig. 1 is a side elevation of an apparatus embodying the present improvements.
Figure 2:
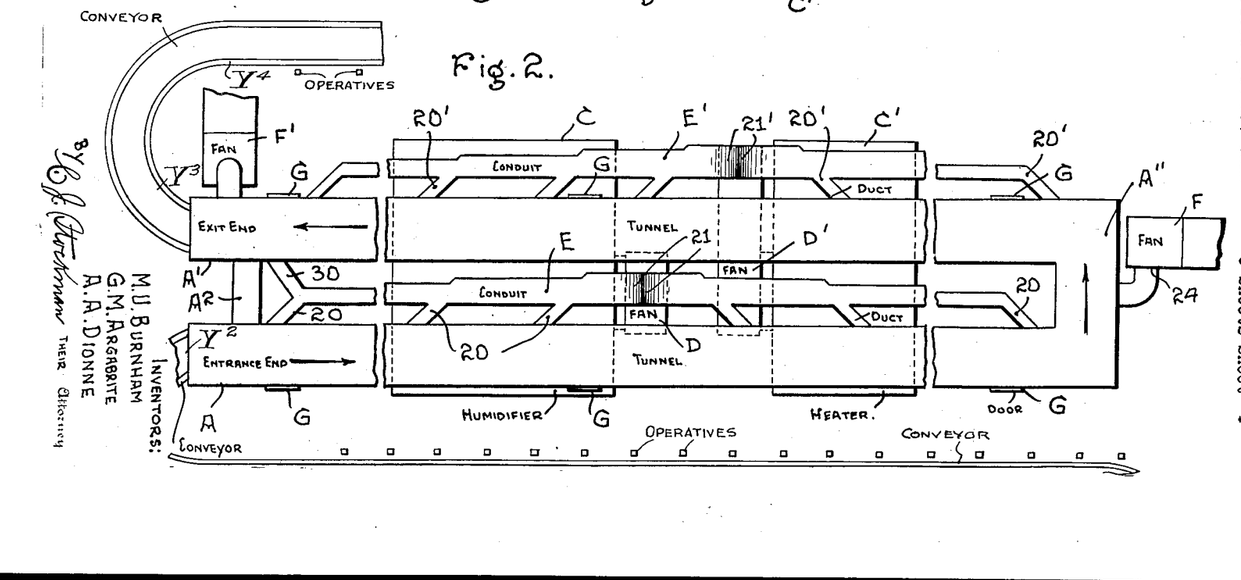
Fig. 2 is a plan view of the same.
Figures 3, 3A:
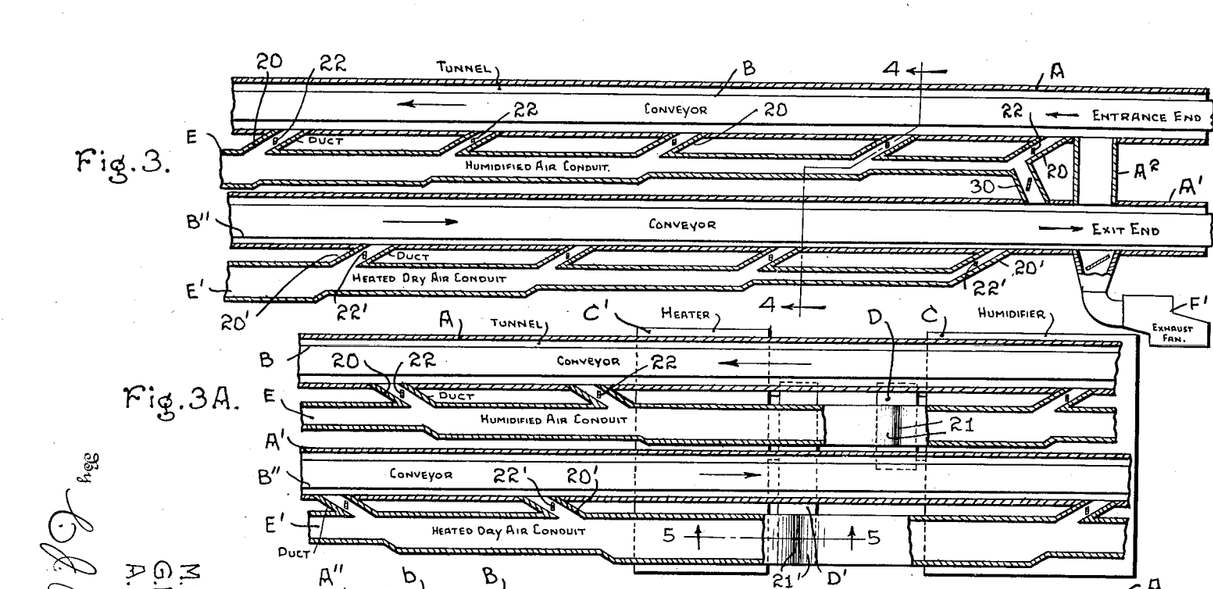
Figure 3B:
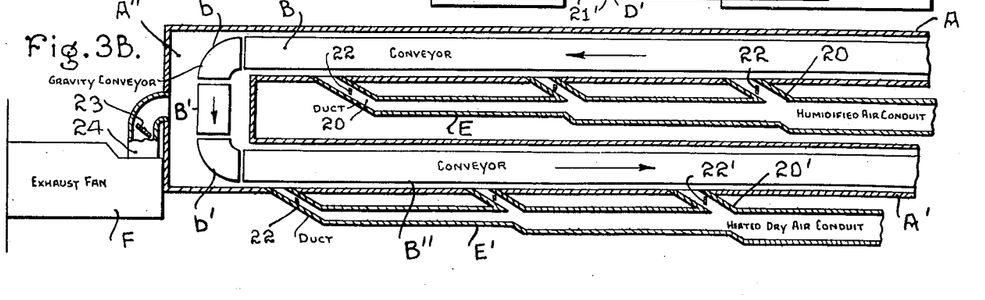
Figure 4:
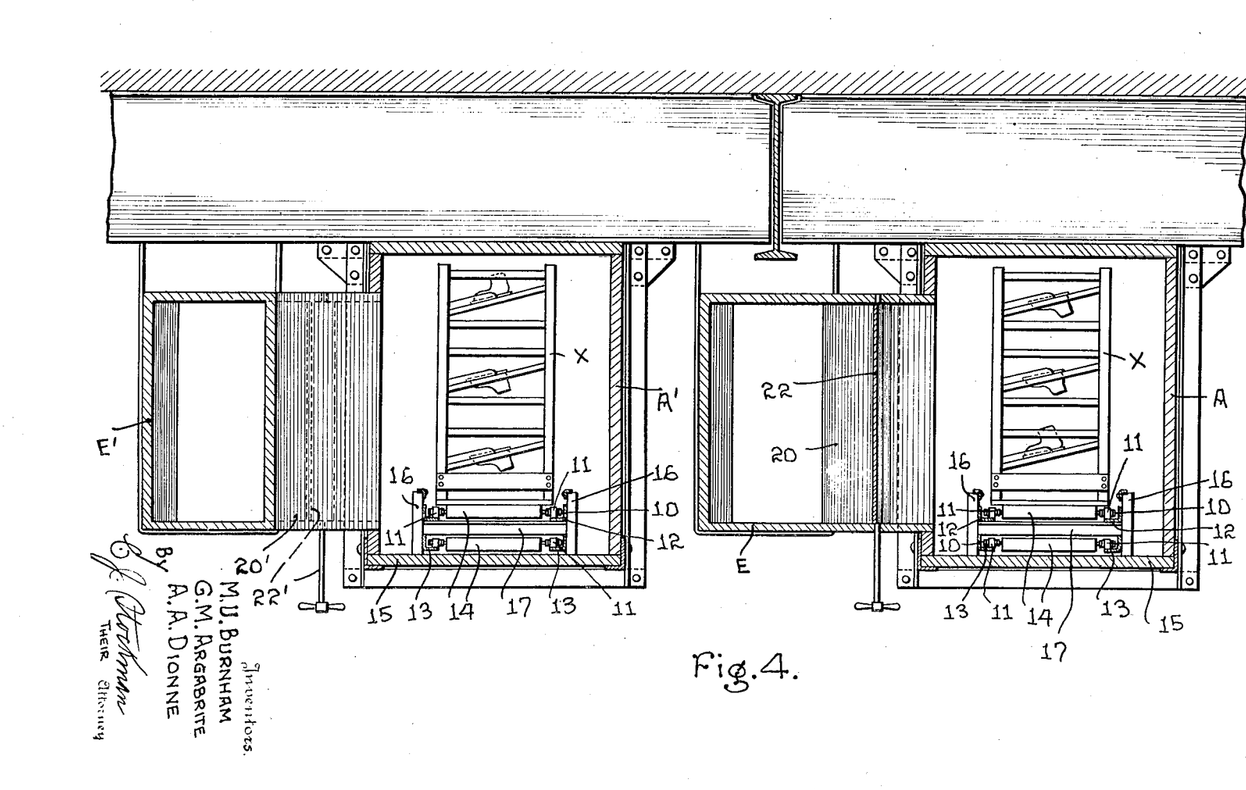
Fig. 4 is a transverse sectional view on a still larger scale taken in the line 4—4 of Fig. 3, for example.
Figure 5:
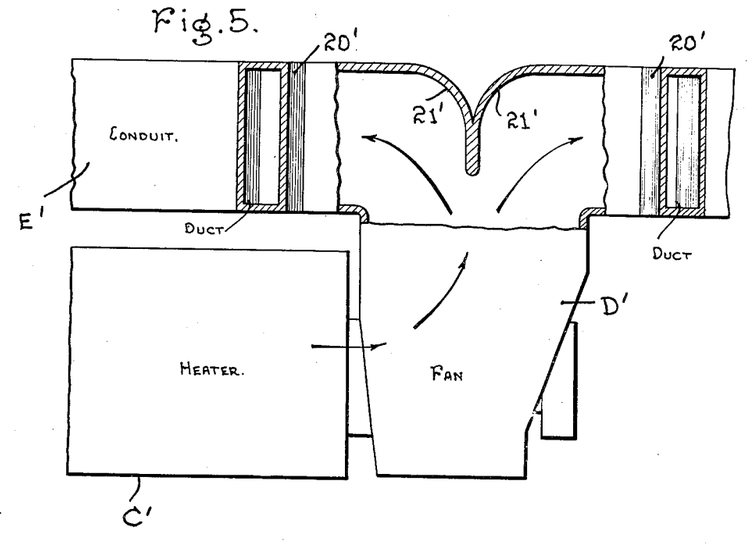
Fig. 5 is a detail sectional view on the line 5—5 of Fig. 3A, particularly intended to show the communication between the heater and the trunk which carries the substantially dry heated air to the portion of the apparatus in which the shoes are subjected to heated substantially dry air.

It is preferred in practice that the chambers A, A' be arranged in an elevated position. They are shown as being supported from the ceiling and their height may be, and preferably is, such as to afford space beneath them for the humidifying and heating means and head room beneath them at opposite sides of said means. It will be understood that the conveyor which carries the racks with the shoes through said chambers also carries said racks and shoes to and away from the chambers. When the chambers are elevated, the portion of the conveyor which carries the racks and shoes to the entrance end of chamber A travels in an upwardly inclined direction, while that portion of the conveyor which carries the racks and shoes away from the exit end of chamber A' travels in a downwardly inclined direction. Figs. 1 and 2 show, conventionally, connected parallel conveyor sections Y, Y' forming a continuous conveyor which extends past a number of operative's stations, marked "operatives," and serving to transfer the racks X from operative to operative and to the elevating conveyor Y² which carries the racks to the receiving end of the chamber A and delivers the same to the conveyor B which traverses said chamber. Fig. 2 shows one side of the section, (Y') which extends to the elevating section Y (the other side of said section Y' being omitted for lack of space to show it) and also shows a lowering conveyor Y³ which extends from the rack discharging end of the tunnel A' and conducts said racks with the conditioned and partially completed shoes downward to a conveyor, or conveyor section, whose end is indicated at Y⁴ and along which other operatives are stationed. The conveyors employed are preferably of the construction shown in our application Number 718,661 hereinbefore identified.

Although the air in its travel through the chamber A absorbs moisture from the shoes traveling through said chamber, it will be noted that the humidification of the air in said chamber A is not caused by such absorption since the air is already in a humidified condition when it leaves the air-washer or conditioner and enters said chamber. The prevention of over-saturation of the air in any drying portion of the chamber under conditions which would cause a deposition of moisture from the air resulting in increasing the moisture in the shoes, of course is important. Any danger of such over-saturation is preventable in the present construction in part by the rapid change of the air in said chamber and in part by the provision of controllable means through which heated humidified air may be supplied to the chamber at different places in the length thereof. In fact, the construction illustrated and described affords provision for substantially complete control of the speed of travel of the air in the chamber A and of its temperature and humidity in the different parts of said chamber. In our practice the correlation of the parts and settings of the regulating members enables us to assure that the air at the entrance and exit ends of the chamber A is almost dry and increases in humidity and temperature from the entrance end toward the middle of the chamber and decreases in temperature and humidity toward the exit end of the chamber. The substantially dry air in the chamber A' is similarly controllable, its rapid change, the provision for its introduction at different places in the length of the chamber and for its increase in temperature from the entrance end of the chamber toward the middle thereof and corresponding decrease from said middle toward the exit end, assuring a drying operation which while expeditious is at the same time safe. The location of the suction fan F' at a place which is aft the entrance end of chamber A and exit end of chamber A' is preferred since it leaves at these places in the dryer areas which are substantially free from wind and whose humidity and temperature are but slightly above, or are substantially those, of the room containing the dryer.

Figure 7:
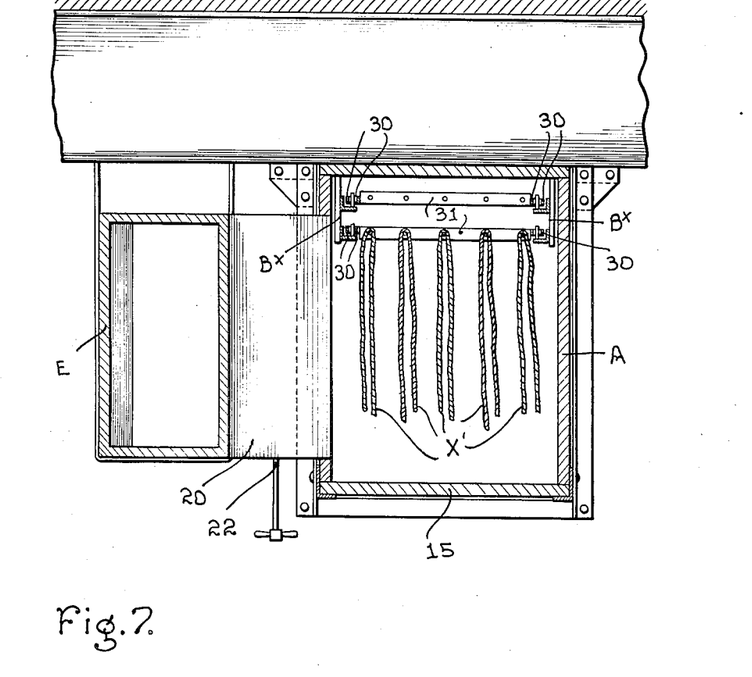
Fig. 7 is a view similar to Fig. 4, illustrating one side of a form of conveyor suitable for the drying of hides.

The apparatus has been particularly described with reference to the drying of shoes and as a part of a conveying mechanism for shoes in the process of the manufacture of the shoes. It is more particularly designed for such use and its greatest utility probably is with relation to that particular application of it. It however, has utility in other applications and for drying of other things than soles, or indeed for other things than leather, although specially useful for such articles as would be hurt if quickly dried entirely in an artificially heated substantially dry air. Hence, it will be understood that reference in this description and in the appended claims to shoe soles or to leather are intended to be construed in an exemplary sense and to apply equally to material of whatever name whose nature is such that it may be successfully or advantageously dried by an apparatus having the correlation of parts set forth in the claims. Fig. 7 is illustrative of the use of the apparatus in the drying of hides as they come from the tanning baths or solutions. The apparatus in such case may be identical in every respect with that described except with relation to the particular carrying means employed. Therefore, it is sufficient to indicate only one of the chambers, the chamber A for example, and the portion of the conduit, the conduit E in this case, which supplies the fluid to said chamber. The conveyor, a portion of which is shown and is designated B˟ if of any suitable endless nature adapted to carry the hides (X') suspended therefrom.

These two exemplifications of the invention show typical conveyors adapted to the carrying of articles to be dried when said articles are respectively of a nature such that they may rest upon a traveling bed and a nature such that they should be suspended from a carrier. The character of the article being dried by the apparatus will determine the type and detail construction of the conveyor employed and any conveyor suitable to such article may of course be adapted and used without departing from the spirit of our invention as defined by appended claims.

It will be observed that in the illustrated embodiment of the invention, no connection of the inlet side of the humidifier C with chamber A, except the connection provided by the humidifier itself and the conduit G, is illustrated. In other words, it is the intent, according to this embodiment, to supply the humidifier with atmospheric air, instead of utilizing it to treat air which has already passed through said chamber A and thereby absorbed moisture from the article with which it has been brought into contact. This is also true with relation to the heater C' which in this embodiment takes the air from the room, there being no connection illustrated through which the air which has passed through the chamber A' and hence has absorbed more or less moisture from the material being dried is led back from the chamber A' to the dryer. The illustrated arrangement has a very important advantage in that accurate control of the heat and humidity of the air supplied to the respective chambers is thereby better assured.

Having thus described the invention what we believe to be new and desire to secure by Letters Patent and what we therefore claim is:—

1. A leather drying apparatus comprising drying portions; means for conveying the articles to be dried through said drying portions, successively; and means for inducing in one of said drying portions a current of rapidly flowing humidified heated air whose temperature at the ends of said portion is lower than that at the intermediate part thereof and for inducing in the other drying portion a current of rapidly flowing heated substantially dry air.

2. A leather drying apparatus comprising drying portions; means for conveying the articles to be dried through said drying portions, successively; and means for inducing in one of said drying portions a current of rapidly flowing humidified heated air and for inducting in the other drying portion a current of rapidly flowing heated substantially dry air whose temperature at the ends of said portion is lower than that at the intermediate part thereof.

3. A leather drying apparatus comprising drying portions; means for conveying the articles to be dried through said drying portions, successively; and means for inducing in one of said drying portions a current of rapidly flowing humidified heated air whose temperature at the ends of said portion is lower than that at the intermediate part thereof and for inducing in the other drying portion a current of rapidly flowing heated substantially dry air whose temperature at the ends of said portion is lower than that at the intermediate part thereof.

4. An apparatus for drying leather, comprising sources of heated humidified air and heated substantially dry air, means for supplying airs from these sources to different drying portions of the apparatus, each at a plurality of places, and for causing the airs to flow rapidly through said drying portions and to be of lower temperatures at the ends of said portions than at the intermediate parts thereof.

5. An apparatus for drying leather comprising sources of heated humidified air and heated substantially dry air, drying chambers, conduits extending longitudinally of the respective chambers, air inlet connections from each conduit to the corresponding chamber at different places in the length of the latter, means by which the conduits are connected at a place intermediate their ends with the source of heated humidified air and source of heated substantially dry air, respectively, and said airs are caused to flow in opposite directions in the respective conduits, and conveying means within said chambers.

6. An apparatus for drying leather comprising sources of heated humidified air and heated substantially dry air, drying chambers, conduits extending longitudinally of the respective chambers, air inlet connections from each conduit to the corresponding chamber at different places in the length of the latter, means by which the conduits are connected at a place intermediate their ends with the source of heated humidified air and source of heated substantially dry air, respectively, and said airs are caused to flow in opposite directions in the respective conduits, current-creating means to cause a rapid flow of the airs through the respective chambers, and conveying means within said chambers.

7. An apparatus for drying leather comprising sources of heated humidified air and heated substantially dry air, drying chambers, conduits operatively related to the drying chambers respectively, each conduit connected with the corresponding drying chamber at a plurality of places, means to supply the heated humidified air to one conduit, under pressure and at a place intermediate the ends of said conduit, means to supply the heated substantially dry air to the other conduit, under pressure and at a place intermediate the ends of this conduit, each conduit having adjacent its inlet means to cause the entering air to flow in opposite directions from said inlet, means to rapidly vent the drying chambers, and conveying means traveling within said chambers.

8. An apparatus for drying leather comprising a first drying chamber and a second drying chamber, a conveying means to cause the leather under treatment to traverse said chambers, successively, and independent means operatively related to said chambers, respectively, to supply heated humidified air to the first chamber and a heated air of lesser humidity to the second chamber and to cause a rapid flow of these airs longitudinally through the respective chambers and substantially prevent admixture of the air in either chamber.

9. An apparatus for drying leather comprising a first drying chamber, a second drying chamber, a conveying means to cause the leather under treatment to traverse said chambers successively, and means operatively related to said chambers, respectively, to supply to and induce in the first chamber a rapidly flowing current of preheated and prehumidified air and to supply to and induce in the second chamber a rapidly flowing current of preheated air having lesser humidity than that in the first chamber, including elements controllable to variably regulate the atmospheric conditions produced in the respective chambers.

10. Means for drying the soles of shoes in the process of the manufacture of said shoes, comprising a conveyor for transferring the shoes from one operative to another, a dryer operatively related to said conveyor and through which the shoes are carried by the conveyor, the conveyor extending outwardly beyond the entrance and exit ends of the dryer, and means to supply heated humidified air and heated substantially dry air to different portions of the dryer and to cause currents of said airs in said different portions, whereby the partially completed shoes in their passage from one operative to another traverse a dryer in which they are subjected successively to the action of currents of heated humidified air and heated substantially dry air.

11. Means for drying the soles of shoes in the process of manufacture of said shoes, comprising a conveyor for transferring the shoes from one operative to another, a dryer having chambers operatively related to successive portions of said conveyor, respectively, the conveyor extending outwardly beyond the entrance and exit ends of the conveyor, means to supply heated humidified air to one chamber at a plurality of different places in the length of the latter, means to supply substantially dry air to the other chamber at a plurality of different places in the length thereof, and means to cause a rapid flow of these airs through the respective chambers.

12. Means for drying the soles of shoes in the process of manufacture of said shoes, comprising a conveyor for transferring the shoes from one operative to another, a dryer having chambers operatively related to successive portions of said conveyor, respectively, the conveyor extending outwardly beyond the entrance and exit ends of the conveyor, means to supply heated humidified air to one chamber at a plurality of different places in the length of the latter, means to supply substantially dry heated air to the other chamber at a plurality of different places in the length thereof, means to cause a rapid flow of these airs through the respective chambers, and means controllable to regulate the supply of the airs to and their speed of flow through the chambers.

13. An apparatus applicable to the drying of leather in motion without breaking down the structure of the leather, said apparatus comprising a conveyor to transfer the leather automatically along a defined course, a first drying chamber and a second drying chamber respectively housing successive portions of said conveyor, means, including an air heater and humidifier and a regulating valve, to create in the first drying chambers a predetermined humid and heated atmospheric condition regulated to cause absorption of moisture from the leather without danger of deposition of moisture upon the leather, and a separate means through which the second drying chamber is supplied with preheated air in regulated quantities to create in said second chamber a predetermined atmospheric condition characterized by lesser humidity than the atmospheric condition existing in the first chamber.

14. An apparatus applicable to the drying of leather in motion without breaking down the structure of the leather, comprising a conveyor to transfer the leather automatically along a defined course, a first drying chamber and a second drying chamber housing successive portions of said conveyor, means to create in the first drying chamber a rapidly flowing current of continuously changing preheated and prehumified air having a moisture absorbent relation to the leather traversing said chamber, and means to create in said second drying chamber a rapidly flowing current of preheated air having a lesser moisture content than that in the first chamber.

15. An apparatus applicable to the drying of leather in motion without breaking down the structure of the leather, comprising a conveyor to transfer the leather automatically along a defined course, a first drying chamber and a second drying chamber housing successive portions of said conveyor, means to create in the first drying chamber a rapidly flowing current of continuously changing preheated and prehumidified air having a moisture absorbent relation to the leather traversing said chamber, and means to create in said second drying chamber a rapidly flowing current of preheated air having a higher temperature and a lesser moisture content than that in the first drying chamber.

16. An apparatus applicable to the drying of leather in motion without breaking down the structure of the leather, comprising a conveyor to transfer the leather automatically along a defined course, a first drying chamber and a second drying chamber housing successive portions of said conveyor, means to create in the first drying chamber a rapidly flowing current of continuously changing preheated and prehumidified air having a moisture absorbent relation to the leather traversing said chamber, and means to create in said second drying chamber a rapidly flowing current of preheated substantially dry air.

17. An apparatus applicable to the drying of leather in motion without breaking down the structure of the leather, comprising a conveyor to transfer the leather automatically along a defined course, a first drying chamber and a second drying chamber housing successive portions of said conveyor, means to create in the first drying chamber a rapidly flowing current of continuously changing preheated and prehumidified air having a moisture absorbent relation to the leather traversing said chamber, and means to create in said second drying chamber a rapidly flowing current of preheated substantially dry air having a higher temperature than that in the first chamber.

18. An apparatus applicable to the drying of leather in motion without breaking down the structure of the leather, said apparatus comprising a conveyor to transfer the leather automatically along a defined course, a first drying chamber and a second drying chamber respectively housing successive portions of said conveyor, means to create in the first drying chamber a heated and humid atmospheric condition, an external source of heated substantially dry air, means through which the preheated substantially dry air is admitted to the second chamber at a plurality of places in the length of the latter, means regulating the admission of said substantially dry air at said plurality of places, respectively, and means to cause a rapid flow of the air through said second chamber and the rapid venting of said chamber.

19. An apparatus applicable to the drying of leather in motion without breaking down the structure of the leather, said apparatus comprising a conveyor to transfer the leather automatically along a defined course, a first drying chamber and a second drying chamber respectively housing successive portions of said conveyor, an external air heating and humidifying means, means through which this preheated and prehumidified air is supplied to the first chamber at a plurality of places in the length of the latter, means respectively to control the admission of the air to said chamber at said places, means to cause a rapid flow of the air through said chamber and the rapid venting of the chamber, and means to subject the leather in its passage through the second chamber to the action of a rapidly flowing current of substantially dry air.

20. An apparatus applicable to the drying of leather in motion without breaking down the structure of the leather, said apparatus comprising a conveyor or transfer the leather automatically along a defined course, a first drying chamber and a second drying chamber respectively housing successive portions of said conveyor, an external air heating and humidifying means, means through which this preheated and prehumidified air is supplied to the first chamber at a plurality of separately regulatable places in the length of the latter, means to cause a rapid venting of the chamber, and means to subject the leather in its passage through the second chamber to the action of preheated non-humidified air including elements through which the air is introduced into the second chamber at a plurality of separately regulatable places in the length of said chamber and a means for causing a rapid venting of said chamber.

21. A leather drying apparatus applicable to the drying of leather in motion without breaking down the structure of the leather, said apparatus comprising a conveyor to transfer the leather automatically along a defined course, a first drying chamber and a second drying chamber respectively housing successive portions of said conveyor, means to create in the first drying chamber an atmospheric condition characterized by relatively low temperature and high humidity and in the second chamber an atmospheric condition characterized by relatively high temperature and low humidity, including an air heater and humidifier arranged outside of and having communication with said first chamber and a separate air-heater arranged outside of and having communication with said second chamber, and means for inducing rapid flows of these airs in the said chambers, respectively, and the rapid venting of the chambers.

22. Means applicable to the drying of the soles of partially completed shoes without breaking down the structure of the leather and which forms a part of an apparatus utilizing a conveyor to transfer the shoes between the various operatives, comprising, in combination a conveying means for shoe racks and a drying means through which the racks are moved by the conveying means, the conveying means extending at both ends beyond the drying means, and the drying means including a first drying chamber and a second drying chamber housing successive portions of the conveyor, means through which the first drying chamber is supplied with a current of preheated and prehumidified air having a moisture transferring relation to the shoes traversing said chamber and means through which the second drying chamber is supplied with a current of preheated air having a lesser moisture content than that supplied to the first chamber.

23. Means applicable to the drying of the soles of partially completed shoes without breaking down the structure of the leather and which forms a part of an apparatus utilizing a conveyor to transfer the shoes between the various operatives, comprising, in combination with said conveyor, a first drying chamber and a second drying chamber housing successive portions of the conveyor. means through which heated humidified air is supplied to the first chamber at a plurality of different places in the length of the latter, means through which heated air having lesser humidity is supplied to the second chamber at a plurality of different places in the length thereof and means regulatable to control the supply of these airs at the different places in the length of the respective chambers.

24. Means applicable to the drying of the soles of partially completed shoes without breaking down the structure of the leather and which forms a part of an apparatus utilizing a conveyor to transfer the shoes between the various operatives, comprising, in combination with said conveyor, a first drying chamber and a second drying chamber housing successive portions of the conveyor, means to supply heated humidified air to the first chamber and heated air of lesser humidity to the second chamber and to cause a rapid flow of these airs longitudinally through the respective chambers, including regulatable means to variably control the atmospheric conditions in the respective chambers.

25. An apparatus for drying leather comprising a first drying chamber and a second drying chamber, a conveyor means to cause the leather under treatment to traverse the first chamber and thereafter the second chamber, separate valve controlled means operatively related to said chambers respectively, and through which heated humidified air is supplied to the first chamber and a heated air of lesser humidity is supplied to the second chamber, and means to cause a rapid flow of these airs longitudinally of the respective chambers.

26. An apparatus for drying leather comprising a first drying chamber and a second drying chamber, a conveying means to cause the leather under treatment to traverse said chambers successively, means through which preheated and prehumidified air is supplied to the first chamber and preheated air of lesser humidity is supplied to the second chamber, respectively, each of said means having a plurality of valve controlled air passages connected to the corresponding chamber at different places in the length of the latter, the valves in said passages being separately operative to vary the atmospheric conditions to be created in the chambers, and means to cause a rapid change of the air in the respective chambers.

27. Means for automatically drying the soles of shoes comprising a conveyor for transferring shoes from operative to operative in the manufaucture of the shoes and drying means including chambers which house successive portions of the conveyor and cause the shoes the soles of which have been wetted in one stage of the manufacture of the shoes to be automatically dried and conditioned prior to subsequent stages in said manufacture and while in motion between certain operatives, the said drying means also including means regulatable to variably introduce preheated and prehumidified air in one chamber and preheated air of lesser humidity in the other chamber, to produce predetermined atmospheric conditions in the respective chamber, characterized by greater humidity and lower temperature in the chamber through which the shoes first pass than in the chamber through which they later pass.

In testimony whereof we affix our signatures.

MORRIS U. BURNHAM.
GEORGE M. ARGABRITE.
ARTHUR A. DIONNE.